(12) United States Patent
Michal (10) Patent No.: US 11,984,796 B2
(45) Date of Patent: May 14, 2024

(54) FLYING CAPACITOR TOPOLOGY FOR DC OR AC OUTPUT FROM A DC SOURCE

(71) Applicant: STMicroelectronics (Grenoble 2) SAS, Grenoble (FR)

(72) Inventor: Vratislav Michal, Fontanil-Cornillon (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 117 days.

(21) Appl. No.: 17/677,806

(22) Filed: Feb. 22, 2022

(65) Prior Publication Data
US 2022/0321028 A1    Oct. 6, 2022

(30) Foreign Application Priority Data
Apr. 2, 2021   (FR) ....................... 2103449

(51) Int. Cl.
*H02M 3/07*    (2006.01)
*H02M 1/00*    (2006.01)

(52) U.S. Cl.
CPC ........... *H02M 1/0095* (2021.05); *H02M 3/07* (2013.01)

(58) Field of Classification Search
CPC ...................... H02M 3/07–078; H02M 7/4837
See application file for complete search history.

(56) References Cited

U.S. PATENT DOCUMENTS

2019/0348913 A1   11/2019   Zhang et al.
2020/0212795 A1   7/2020    Das et al.
2020/0218300 A1   7/2020    Zhang et al.

FOREIGN PATENT DOCUMENTS

GB       2472701 A    2/2011

*Primary Examiner* — Peter M Novak
(74) *Attorney, Agent, or Firm* — Slater Matsil, LLP (57) ABSTRACT

In an embodiment a power converter includes a first capacitor and a second capacitor coupled in series with the first capacitor, wherein the converter is configured to charge, during a first phase, the first and second capacitors by a supply voltage so that a voltage across terminals of each of the first and second capacitors is substantially equal to half the supply voltage and discharge, during a second phase, the second capacitor to a third capacitor.

20 Claims, 9 Drawing Sheets

FLYING CAPACITOR TOPOLOGY FOR DC OR AC OUTPUT FROM A DC SOURCE

CROSS-REFERENCE TO RELATED APPLICATIONS

This application claims the benefit of French Application No. 2103449, filed on Apr. 2, 2021, which application is hereby incorporated herein by reference.

TECHNICAL FIELD

The present disclosure relates generally to electronic devices, and in particular power converters and methods of controlling power converters.

BACKGROUND

Among the types of electric power converters, there are DC-to-DC (or DCDC) converters, in other words an electronic circuit that converts a source of direct current (DC) from one voltage level to another, and DC-to-AC (DCAC) converters (which may be referred to as "inverters"), in other words an electronic circuit that converts a source of direct current (DC) to an alternating current (AC).

SUMMARY

One or more embodiments address at least some of the drawbacks of known power converters.

Various embodiments provide a power converter comprising a first capacitor, and a second capacitor coupled in series with the first capacitor, the converter being configured to have:
  a first phase during which the first and second capacitors are charged by a supply voltage so that the voltage across the terminals of each of the first and second capacitors is substantially equal to half the supply voltage; and
  a second phase during which the second capacitor is discharged to a third capacitor.

In at least some embodiments, the first and second capacitors may be configured to withstand half the input supply voltage.

Various other embodiments provide a method for controlling a power converter comprising a first capacitor, and a second capacitor coupled in series with the first capacitor, the method comprising:
  a first phase during which the first and second capacitors are charged by a supply voltage so that the voltage across the terminals of the first and second capacitors is substantially equal to half the supply voltage; and
  a second phase during which the second capacitor is discharged to a third capacitor.

According to an embodiment, the first and second capacitors have the same capacitance as each other.

According to an embodiment, the power converter is configured so that the average of the current flowing through the first capacitor during a first and a second phase is substantially equal to zero.

According to an embodiment, the power converter comprises a fourth capacitor, having the same capacitance as the second capacitor, coupled in series with the first capacitor, the power converter being configured so that:
  during the first phase, the fourth capacitor is discharged to the third capacitor; and
  during the second phase, the first capacitor is discharged to the fourth capacitor.

According to an embodiment:
  a first switch, the first capacitor, the second capacitor and a second switch are coupled in series between a node configured to receive the supply voltage and a reference node; and
  a third switch, the fourth capacitor, and a fourth switch are coupled in series between the reference node and the output node,
  the first, second, third and fourth switches being configured to be on during the first phase and off during the second phase.

According to an embodiment:
  a fifth switch, the first capacitor, a sixth switch and the fourth capacitor are coupled in series; and
  the fifth switch, the second capacitor and a seventh switch are coupled in series between the reference node and an output node,
  the fifth, sixth and seventh switches being configured to be off during the first phase and on during the second phase.

According to an embodiment, the power converter comprises:
  a ninth switch coupled between the first capacitor and the sixth switch, the ninth switch being configured to be off during the first phase and on during the second phase;
  a tenth switch coupled in parallel with the first capacitor and the ninth switch, the tenth switch being configured to be on during the first phase and off during the second phase.

According to an embodiment:
  a first switch, the first capacitor, a second switch and the second capacitor are coupled in series between a node configured to receive the supply voltage and a reference node. The first switch, a third switch, a fourth switch and the second capacitor are coupled in series between the node configured to receive the supply voltage and the reference node.
  The node coupling the first capacitor and the second switch is coupled to the reference node by a fifth switch, and is coupled to a first output node by a first inductor. The node coupling the third switch and the fourth switch is coupled to the reference node by a sixth switch and is coupled to a second output node by a second inductor.

According to an embodiment;
  a first switch, the first capacitor, and a second switch are coupled in series between a node configured to receive the supply voltage and a reference node.
  The first switch, a third switch and a fourth switch are coupled in series between the node configured to receive the supply voltage and the reference node.
  The first switch, a fifth switch and the second capacitor are coupled in series between the node configured to receive the supply voltage and the reference node.
  The node coupling the first capacitor and the second switch is coupled to the node coupling the second capacitor and the fifth switch by a sixth switch, and is coupled to a first output node by a first inductor.
  The node coupling the third switch and the fourth switch is coupled to a second output node by a second inductor.

According to an embodiment, a resistor is coupled between the first and second output node, the voltage across the terminals of the resistor being an output voltage of the converter.

According to an embodiment, the power converter comprises a first resistor and a second resistor, each of the first and second resistors being coupled between one of the first and second output nodes and the reference node.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Unless specified otherwise, the terminals of the switch described correspond to the conduction terminals and not the control terminal.

The DCDC converters described herein are buck converters. A buck converter (step-down converter) is a DC-to-DC power converter that steps down voltage (while drawing less average current) from its input (supply) to its output (load).

Figure 1:
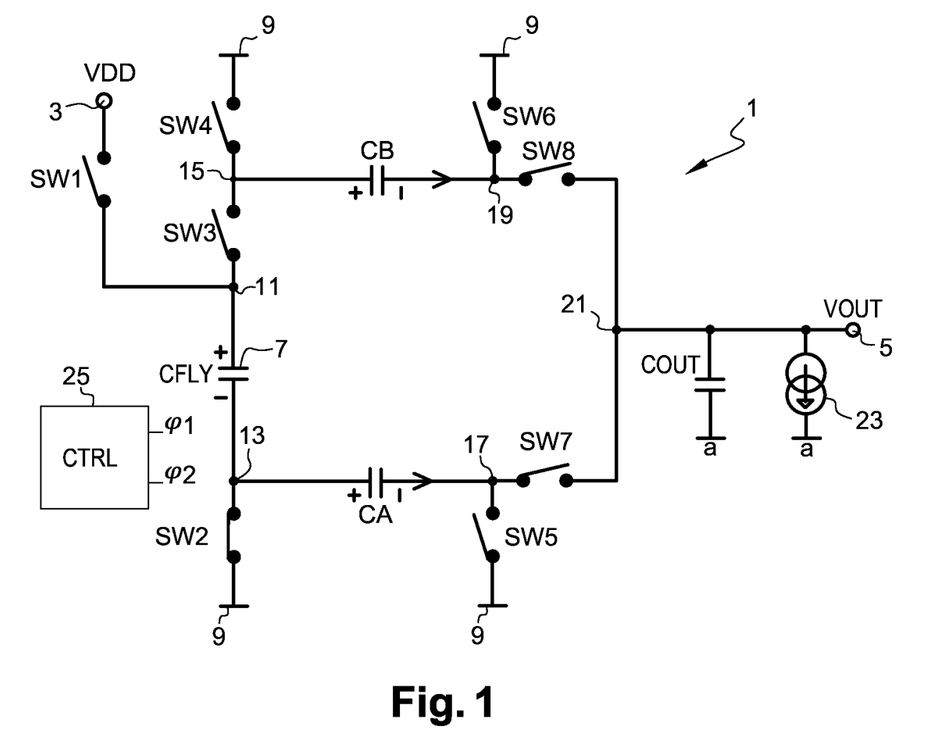
FIG. 1 is a circuit diagram illustrating an embodiment of a power converter.

FIG. 1 is a circuit diagram illustrating an embodiment of a power converter. More precisely, FIG. 1 illustrates a DCDC converter 1. The converter 1 is configured to halve the supply voltage and to provide a negative output voltage.

The converter 1 is powered by a supply voltage VDD. In other words, the converter 1 receives, on a node 3, the voltage VDD. The converter is configured to provide, on an output node 5, a negative output voltage VOUT, substantially equal to half the supply voltage VDD.

The converter 1 comprises a capacitor 7 (CFLY), or flying capacitor. The capacitor 7 is coupled between the node 3 and a reference node 9 on which is applied a reference voltage, for example the ground. More precisely, a first terminal (+) of the capacitor 7 is coupled to the node 3 by a switch SW1 and a second terminal (−) of the capacitor 7 is coupled to the node 9 by a switch SW2. In other words, a terminal of the switch SW1 is coupled, preferably connected, to the node 3, and another terminal of the switch SW1 is coupled, preferably connected, to a node 11. The first terminal (+) of the capacitor 7 is coupled, preferably connected, to the node 11 and the second terminal (−) of the capacitor 7 is coupled, preferably connected, to a node 13. A terminal of the switch SW2 is coupled, preferably connected, to the node 13 and another terminal of the switch SW2 is coupled, preferably connected, to the node 9. In other words, the switch SW1, the capacitor 7 and the switch SW2 are coupled in series between the node 3 and the node 9.

The switch SW2 and the capacitor 7 are coupled in series with a switch SW3 and a switch SW4. In other words, a terminal of the switch SW4 is coupled, preferably connected, to the node 9 and another terminal of the switch SW4 is coupled, preferably connected, to a node 15. A terminal of the switch SW3 is coupled, preferably connected, to the node 15 and another terminal of the switch SW3 is coupled, preferably connected, to the node 11.

The converter 1 comprises a capacitor CA. The capacitor CA for example has the same capacitance as the capacitor CFLY. The capacitor CA is coupled to the node 9 by the switch SW2 and by a switch SW5. In other words, a first terminal (+) of the capacitor CA is coupled to the node 9 by the switch SW2 and a second terminal (−) of the capacitor CA is coupled to the node 9 by the switch SW5. The first terminal of the capacitor CA is coupled, preferably connected, to the node 13. The second terminal of the capacitor CA is coupled, preferably connected, to a node 17. The switch SW5 is coupled between the node 17 and the node 9. In other words, a terminal of the switch SW5 is coupled, preferably connected, to the node 17, and another terminal of the switch SW5 is coupled, preferably connected, to the node 9.

Similarly, the converter 1 comprises a capacitor CB. The capacitor CB for example has the same capacitance as the capacitor CA. The capacitor CB for example has the same capacitance as the capacitor CFLY. The capacitor CB is coupled to the node 9 by the switch SW4 and by a switch SW6. In other words, a first terminal (+) of the capacitor CB is coupled to the node 9 by the switch SW4 and a second terminal (−) of the capacitor CB is coupled to the node 9 by the switch SW6. The first terminal of the capacitor CB is coupled, preferably connected, to the node 15. The second terminal of the capacitor CB is coupled, preferably connected, to a node 19. The switch SW6 is coupled between the node 19 and the node 9. In other words, a terminal of the switch SW6 is coupled, preferably connected, to the node 19, and another terminal of the switch SW6 is coupled, preferably connected, to the node 9.

The node 17 is coupled to a node 21 by a switch SW7. In other words, a terminal of the switch SW7 is coupled, preferably connected, to the node 17 and another terminal of the switch SW7 is coupled, preferably connected, to the node 21. Similarly, the node 19 is coupled to the node 21 by a switch SW8. In other words, a terminal of the switch SW8 is coupled, preferably connected, to the node 19 and another terminal of the switch SW8 is coupled, preferably connected, to the node 21.

The node 21 is coupled, preferably connected, to the output node 5. The node 21 is coupled to the node 9 by an output capacitor COUT. In other words, a terminal of the output capacitor COUT is coupled, preferably connected, to the node 21 and another terminal of the capacitor COUT is coupled, preferably connected, to node 9. The node 21 is further coupled to the node 9 by a current source 23. In other words, a terminal of the source 23 is coupled, preferably connected, to the node 21 and another terminal of the source 23 is coupled, preferably connected, to node 9. The source 23 and the capacitor COUT are coupled in parallel.

The converter 1 for example comprises a control circuit (CTRL) 25 configured to control each of the switches of the converter 1. For example, the control circuit 25 is configured to generate a control signal φ1 for controlling the switches SW1, SW4, SW5 and SW8 and a control signal φ2 for controlling the switches SW2, SW3, SW6 and SW7.

Figure 2:
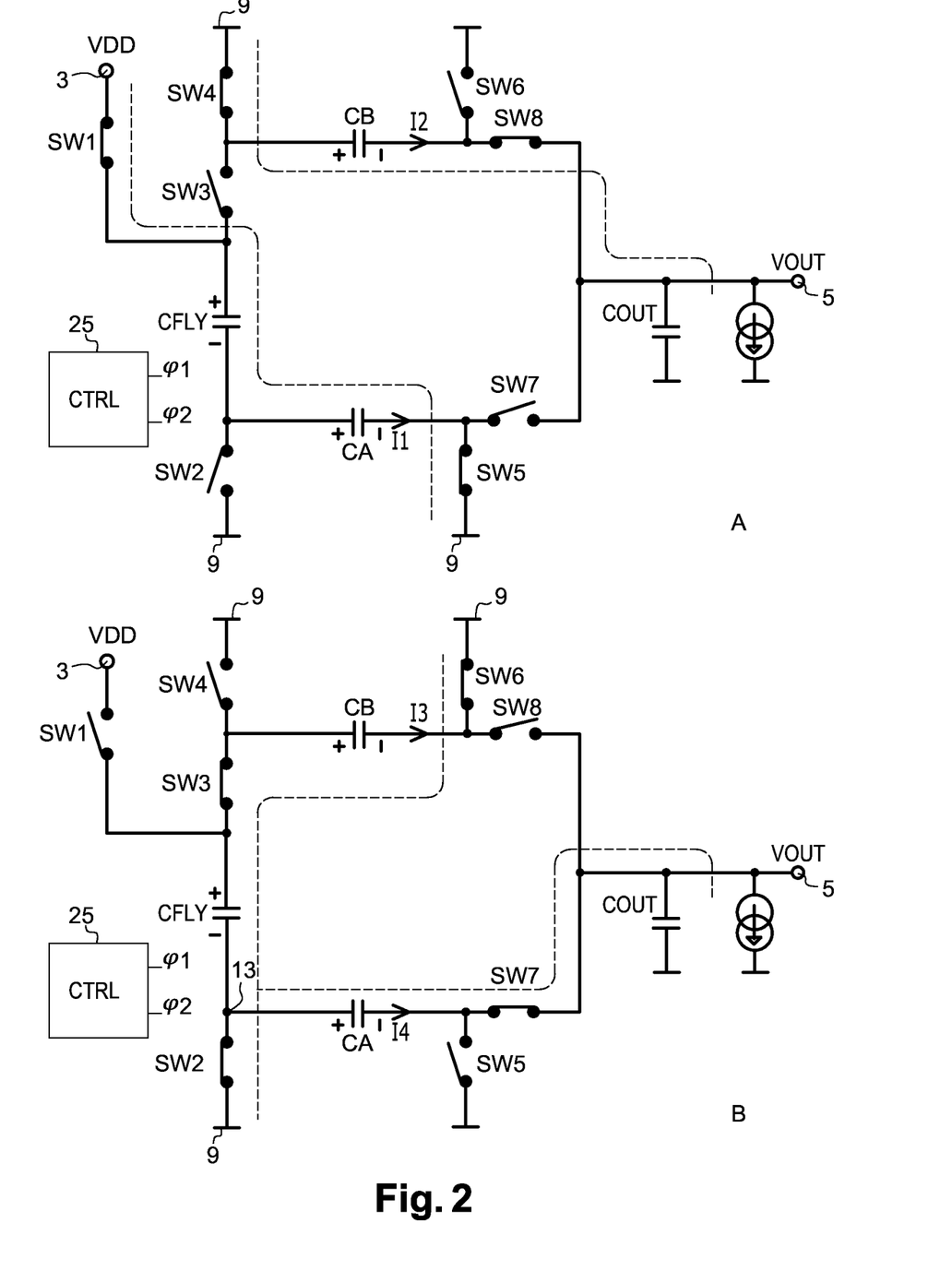
FIG. 2 illustrates a method for controlling the embodiment of FIG. 1.

FIG. 2 illustrates a method for controlling the embodiment of FIG. 1, and in particular the control of the various switches. More precisely, FIG. 2 illustrates, by a view A and a view B, the two phases of the embodiment of FIG. 1. Preferably, the running of the embodiment of FIG. 1 comprises, preferably uniquely, an alternation of the phase illustrated by view A, and the phase illustrated by view B.

During the phase illustrated by view A, control signal φ1 is such that the switches SW1, SW4, SW5 and SW8 are on, in other words closed. The control signal φ2 is such that the switches SW2, SW3, SW6 and SW7 are off, in other words opened.

Therefore, a current I1, represented by a dotted line, flows between the node 3 and the node 9, through the switch SW1, the capacitor CFLY, the capacitor CA and the switch SW5. Each of the capacitors CFLY and CA is charged by the supply voltage VDD. The capacitors CFLY and CA are charged until the voltage across the terminals of each capacitor CFLY, CA is substantially equal to half of the supply voltage.

Furthermore, another current I2, represented by another dotted line, flows through the switch SW4, the capacitor CB, the switch SW8, and the capacitor COUT. Prior to this phase, the capacitor CB has been charged until the voltage across the terminals of the capacitor CB reached a value substantially equal to half the supply voltage. Therefore, at the beginning of this phase, the voltage across the terminals of the capacitor CB is substantially equal to half the supply voltage VDD. More precisely, the voltage between the first (+) terminal and the second terminal (−) of the capacitor CB, referenced on the second terminal, is a positive voltage substantially equal to half the supply voltage VDD. During the phase illustrated by view A, the capacitor CB is discharged to the capacitor COUT. The output voltage VOUT is, during this phase, a negative voltage substantially equal to half the supply voltage VDD.

In other words, during the phase illustrated by the view A of FIG. 2, the two capacitors CFLY and CA, coupled in series, are charged by the supply voltage and another capacitor CB is discharged to the output capacitor.

During the phase illustrated by view B, control signal φ2 is such that the switches SW2, SW3, SW6 and SW7 are on, in other words closed. Control signal φ1 is such that the switches SW1, SW4, SW5 and SW8 are off, in other words opened. In other words, the switches on during the phase illustrated by view A are off during the phase illustrated by view B and the switches off during the phase illustrated by view A are on during the phase illustrated by view B.

A current I3, represented by a dotted line, flows through the switch SW2, the capacitor CFLY, the capacitor CB and the switch SW6. The capacitor CFLY, charged during the phase illustrated by view A until the voltage across the terminals of the capacitor CB is substantially equal to half the supply voltage, is discharged to the capacitor CB, until the voltage across the terminals of the capacitor CB is substantially equal to half the supply voltage.

A current I4, represented by another dotted line, flows between the node 9 to the node 5, through the switch SW2, the capacitor CA, and the switch SW7. At the beginning of this phase, the voltage across the terminals of the capacitor CA, charged during the phase illustrated by view A, is substantially equal to half the supply voltage VDD. More precisely, the voltage between the first (+) terminal and the second terminal (−) of the capacitor CA, referenced on the second terminal, is a positive voltage substantially equal to half the supply voltage VDD. During the phase illustrated by view B, the capacitor CA is discharged to the capacitor COUT. The output voltage VOUT is during this phase, a negative voltage substantially equal to half the supply voltage VDD.

In other words, during the phase illustrated by the view A of FIG. 2, the capacitor CFLY is discharged to the capacitor CA and the capacitor CB is discharged to the output capacitor COUT.

During the first phase, the capacitor COUT is charged by the capacitor CB, while the capacitor CA is charged. During the second phase, the capacitor COUT is charged by the capacitor CA, while the capacitor CB is charged. During both phases, the capacitor CFLY is in series with one of the capacitors CA, CB, resulting in the voltage across the terminals of each capacitor not exceeding, as an absolute value, a maximal value substantially equal to half the supply voltage.

The converter is configured to ensure that the average of the current flowing through the capacitor CFLY during the first and second phases is substantially equal to zero.

Figure 3:
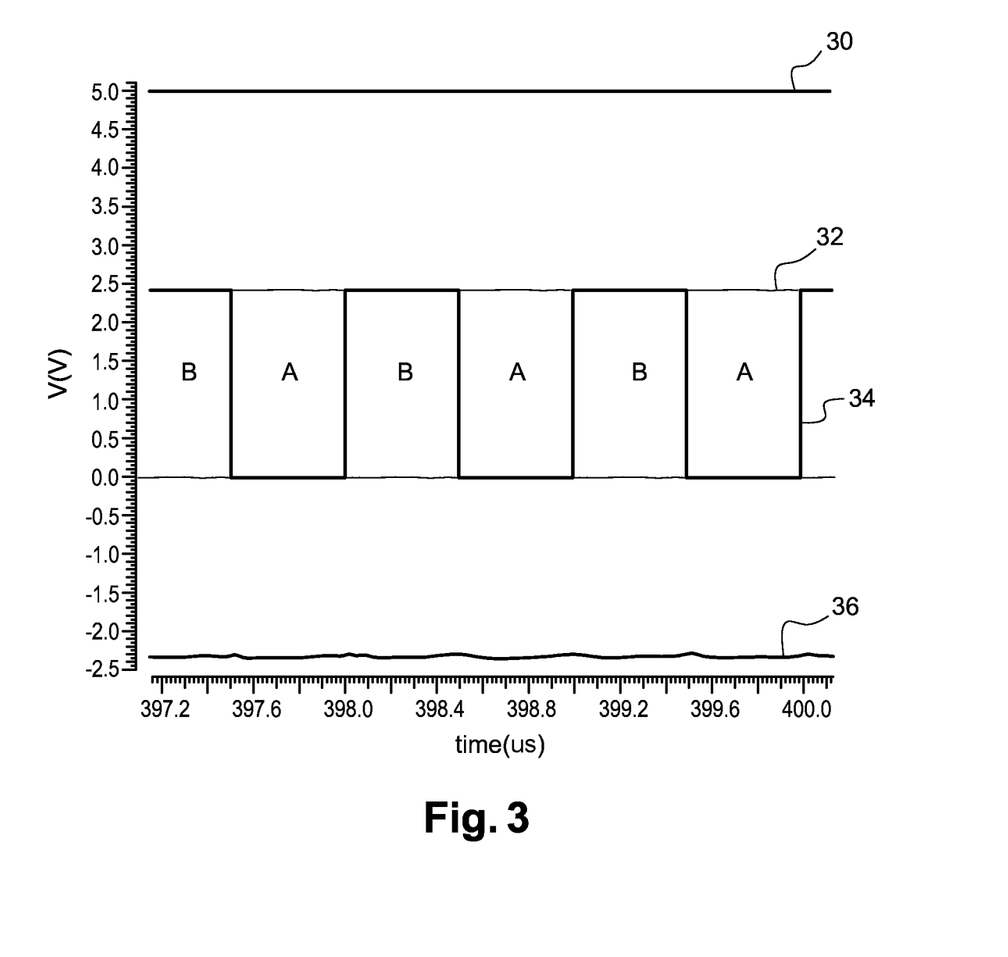
FIG. 3 is a timing diagram illustrating the behavior of the embodiment of FIG. 1.

FIG. 3 is a timing diagram illustrating the behavior of the embodiment of FIG. 1. More precisely, FIG. 3 illustrates the behavior of several voltages, in volts, (V(V)) as a function of time, in microseconds, (time(us)) of the converter 1:
  the supply voltage VDD, corresponding to a curve 30;
  the voltage on the node 13, corresponding to a curve 32;
  the voltage on the node 15, corresponding to a curve 34; and
  the output voltage VOUT, corresponding to a curve 36.

The supply voltage VDD is substantially constant. The supply voltage VDD is substantially equal, in this example, to 5 V.

The output voltage VOUT is also substantially constant. In this example, the output voltage is substantially equal to −2.5 V. The output voltage VOUT is substantially equal to minus half of the supply voltage during the running of the converter 1.

The behavior of the converter comprises an alternation of phases A corresponding to view A of FIG. 2, and of phases B corresponding to view B of FIG. 2.

During phases A, the switch SW4 is on, and the node 15 corresponds to the node 9. Therefore, the voltage on the node 15, represented by curve 34, has the value of the reference voltage, here 0 V. Furthermore, the switch SW2 is off and the node 13 corresponds to the mid-point of the series comprising the capacitors CFLY and CA. The value of the voltage on the node 13 corresponds to the value of the voltage across the terminals of the capacitor CA, and corresponds to the supply voltage minus the voltage across the terminals of the capacitor CFLY. The value of the voltage on the node 13, represented by the curve 32, is substantially equal during phase A to half the supply voltage, for example 2.5 V.

During phase B, the switch SW2 is on, and the node 13 corresponds to the node 9. Therefore, the voltage on the node 13, represented by curve 32, has the value of the reference voltage, here 0 V. Furthermore, the switch SW4 is off and the node 15 corresponds to the mid-point of the series comprising the capacitors CFLY and CB. The value of the voltage on the node 15 corresponds to the value of the voltage across the terminals of the capacitor CB, and corresponds to the supply voltage minus the voltage across the terminals of the capacitor CFLY. The value of the voltage on the node 15, represented by the curve 34, during phase B is substantially equal to half the supply voltage, for example 2.5 V.

More generally, the converter 1 is configured so that the voltages across the terminals of the capacitors CFLY, CA and CB do not exceed a maximum value substantially equal to half the supply voltage. Furthermore, the converter is configured so that the voltage across the terminals of the switches SW1, SW2, SW4, SW5, SW6, SW7 and SW8 does not exceed, as an absolute value, half the supply voltage. Therefore, the capacitors CFLY, CA, CB and the switches SW1, SW2, SW4, SW5, SW6, SW7, are sized to support half the supply voltage. The capacitors CFLY, CA, CB and the switches SW1, SW2, SW4, SW5, SW6, SW7 advantageously do not have to be able to support, across their terminals, the supply voltage VDD.

Figure 4:
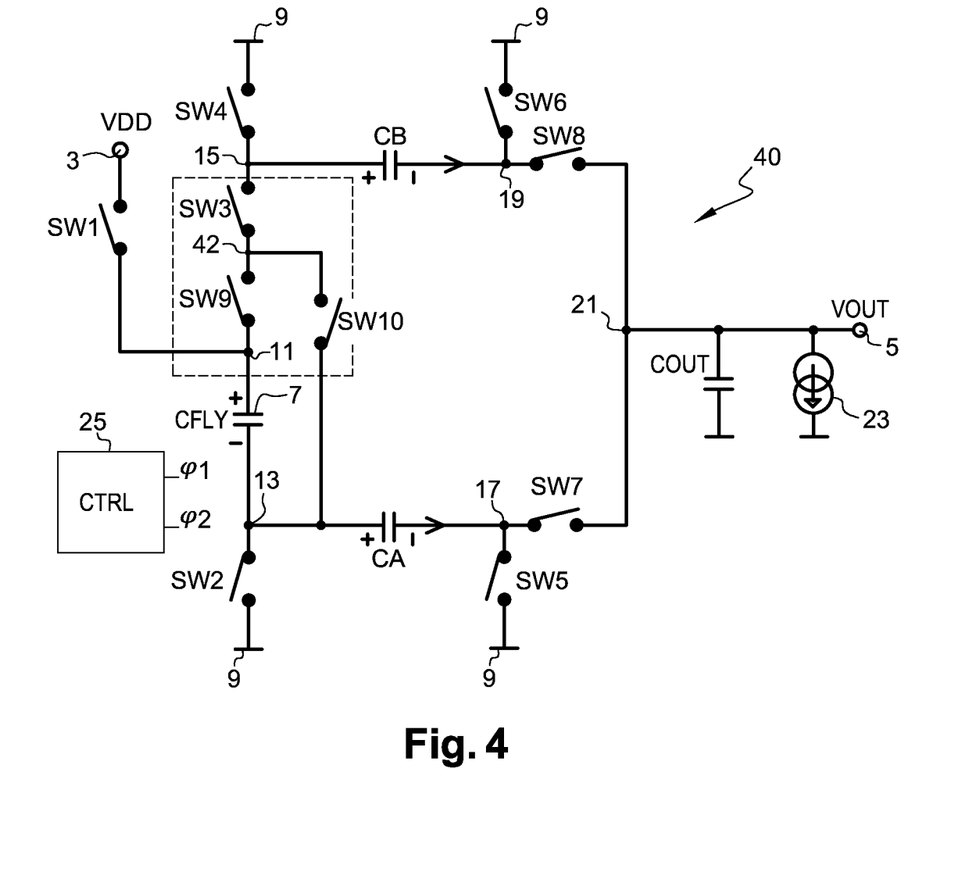
FIG. 4 is a circuit diagram illustrating another embodiment of a power converter.

FIG. 4 illustrates another embodiment of a power converter 40.

The converter 40 differs from the converter 1 in that the converter 40 comprises two additional switches SW9 and SW10.

The switch SW9 is coupled between the capacitor CFLY and the switch SW3. In other words, the capacitor CFLY, the switch SW9 and the switch SW3 are coupled in series in this order between the node 13 and the node 15. In other words, a terminal (−) of the capacitor CFLY is coupled, preferably connected, to the node 13 and another terminal (+) of the capacitor CFLY is coupled, preferably connected, to the node 11. A terminal of the switch SW9 is coupled, preferably connected, to the node 11 and another terminal of the switch SW9 is coupled, preferably connected, to a node 42. A terminal of the switch SW3 is coupled, preferably connected, to the node 42 and another terminal of the switch SW3 is coupled, preferably connected, to a node 15.

Furthermore, the switch SW10 is coupled between the node 42 and the node 13. In other words, a terminal of the switch SW10 is coupled, preferably connected, to the node 42 and another terminal of the switch SW10 is coupled, preferably connected, to the node 13.

The converter 40 generates, like the converter 1, a negative output voltage substantially equal to half the supply voltage VDD. The method for controlling the converter 40 is identical to the method described in relation with FIG. 2, with the addition of the control of the switch SW9, which is off during the phase corresponding to view A of FIG. 2, and on during the phase corresponding to view B of FIG. 2, and the addition of the control of the switch SW10, which is on during the phase corresponding to view A of FIG. 2, and off during the phase corresponding to view B of FIG. 2.

The converter 40 for example comprises the control circuit (CTRL) 25 configured to control each of the switches of the converter 40. For example, the control circuit 25 is configured to generate a control signal φ1 for controlling the switches SW1, SW4, SW5, SW8 and SW10 and a control signal φ2 for controlling the switches SW2, SW3, SW6, SW7 and SW9.

An advantage of this embodiment is that all switches, including switch SW3, are configured, and therefore can be sized, to support across their terminals a maximum voltage substantially equal to half the supply voltage.

Figure 5:
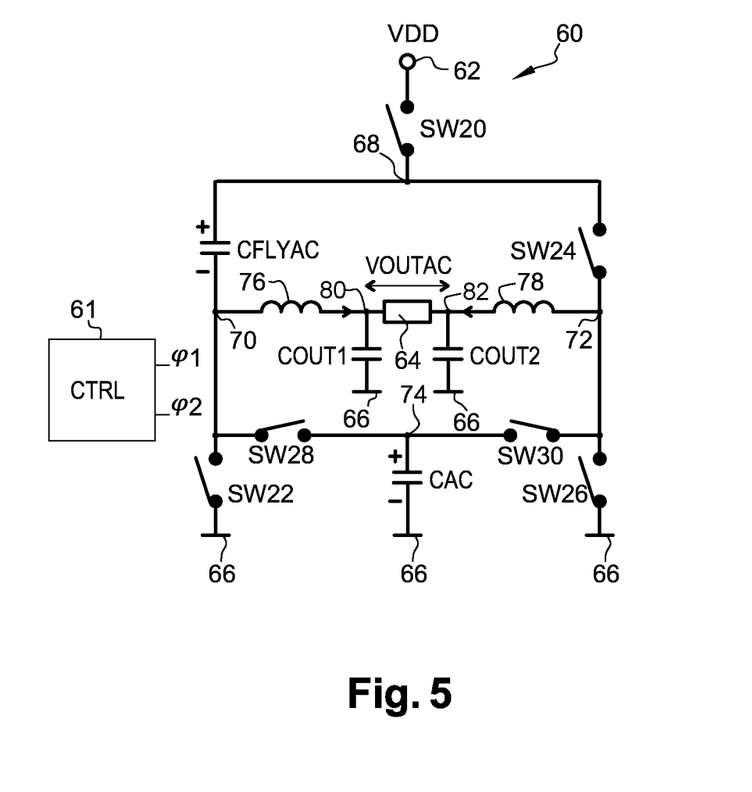
FIG. 5 is a circuit diagram illustrating another embodiment of a power converter.

FIG. 5 illustrates another embodiment of a power converter 60. The converter 60 is a DCAC power converter.

The converter 60 is powered by the supply voltage VDD. In other words, the converter 60 receives, on a node 62, the voltage VDD. The converter 60 is configured to provide, across the terminals of a resistor 64, an output voltage VOUTAC.

The converter 60 comprises a capacitor CFLYAC. The capacitor CFLYAC is coupled between the node 62 and a reference node 66 on which is applied a reference voltage, for example the ground. More precisely, a first terminal (+) of the capacitor CFLYAC is coupled to the node 62 by a switch SW20 and a second terminal (−) of the capacitor CFLYAC is coupled to the node 66 by a switch SW22. In other words, a terminal of the switch SW20 is coupled, preferably connected, to the node 62, and another terminal of the switch SW20 is coupled, preferably connected, to a node 68. The first terminal (+) of the capacitor CFLYAC is coupled, preferably connected, to the node 68 and the second terminal (−) of the capacitor CFLYAC is coupled, preferably connected, to a node 70. A terminal of the switch SW22 is coupled, preferably connected, to the node 70 and another terminal of the switch SW22 is coupled, preferably connected, to the node 66. In other words, the switch SW20, the capacitor CFLYAC and the switch SW22 are coupled in series between the node 62 and the node 66.

The switch SW20 is further coupled in series with a switch SW24 and a switch SW26 between the node 62 and the node 66. More precisely, the switch SW20 is coupled between the nodes 62 and 68. The switch SW24 is coupled between the node 68 and a node 72. The switch SW26 is coupled between the node 72 and the node 66. In other words, a terminal of the switch SW20 is coupled, preferably connected, to the node 62 and another terminal of the switch SW20 is coupled, preferably connected, to the node 68. A terminal of the switch SW24 is coupled, preferably connected, to the node 68 and another terminal of the switch SW24 is coupled, preferably connected, to the node 72. A terminal of the switch SW26 is coupled, preferably connected, to the node 72 and another terminal of the switch SW26 is coupled, preferably connected, to the node 66.

The node 70 is coupled to the node 72 by a switch SW28 and a switch SW30. More precisely, the switch SW28 is coupled between the node 70 and a node 74. The switch SW30 is coupled between the node 72 and the node 74. In other words, a terminal of the switch SW28 is coupled, preferably connected, to the node 70 and another terminal of the switch SW28 is coupled, preferably connected, to the node 74. A terminal of the switch SW30 is coupled, preferably connected, to the node 72 and another terminal of the switch SW30 is coupled, preferably connected, to the node 74.

The node 74 is coupled to the node 66 by a capacitor CAC. In other words, a terminal (+) of the capacitor CAC is coupled, preferably connected, to the node 74 and another terminal (−) of the capacitor CAC is coupled, preferably connected, to the node 66.

The node 70 is further coupled to the node 72 by an inductor 76, the resistor 64 and an inductor 78. More precisely, the inductor 76 is coupled between the node 70 and a node 80. The resistor 64 is coupled between the node 80 and a node 82. The inductor 78 is coupled between the node 82 and the node 72. In other words, a terminal of the inductor 76 is coupled, preferably connected, to the node 70 and another terminal of the inductor 76 is coupled to the node 80. A terminal of the resistor 64 is coupled, preferably connected, to the node 80 and another terminal of the resistor 64 is coupled, preferably connected, to the node 82. A terminal of the inductor 78 is coupled, preferably connected, to the node 82 and another terminal of the inductor 78 is coupled to the node 72.

The converter 60 further comprises two output capacitors COUT1 and COUT2. The capacitor COUT1 is coupled between the node 80 and the node 66. In other words, a terminal of the capacitor COUT1 is coupled, preferably connected, to the node 80 and another terminal of the capacitor COUT1 is coupled, preferably connected, to the node 66. The capacitor COUT2 is coupled between the node 82 and the node 66. In other words, a terminal of the capacitor COUT2 is coupled, preferably connected, to the node 82 and another terminal of the capacitor COUT2 is coupled, preferably connected, to the node 66.

The converter 60 for example comprises a control circuit (CTRL) 61 configured to control each of the switches of the converter 60. For example, the control circuit 61 is configured to generate a control signal φ1 for controlling the switches SW20, SW26 and SW28 and a control signal φ2 for controlling the switches SW22, SW24 and SW30.

Figure 6:
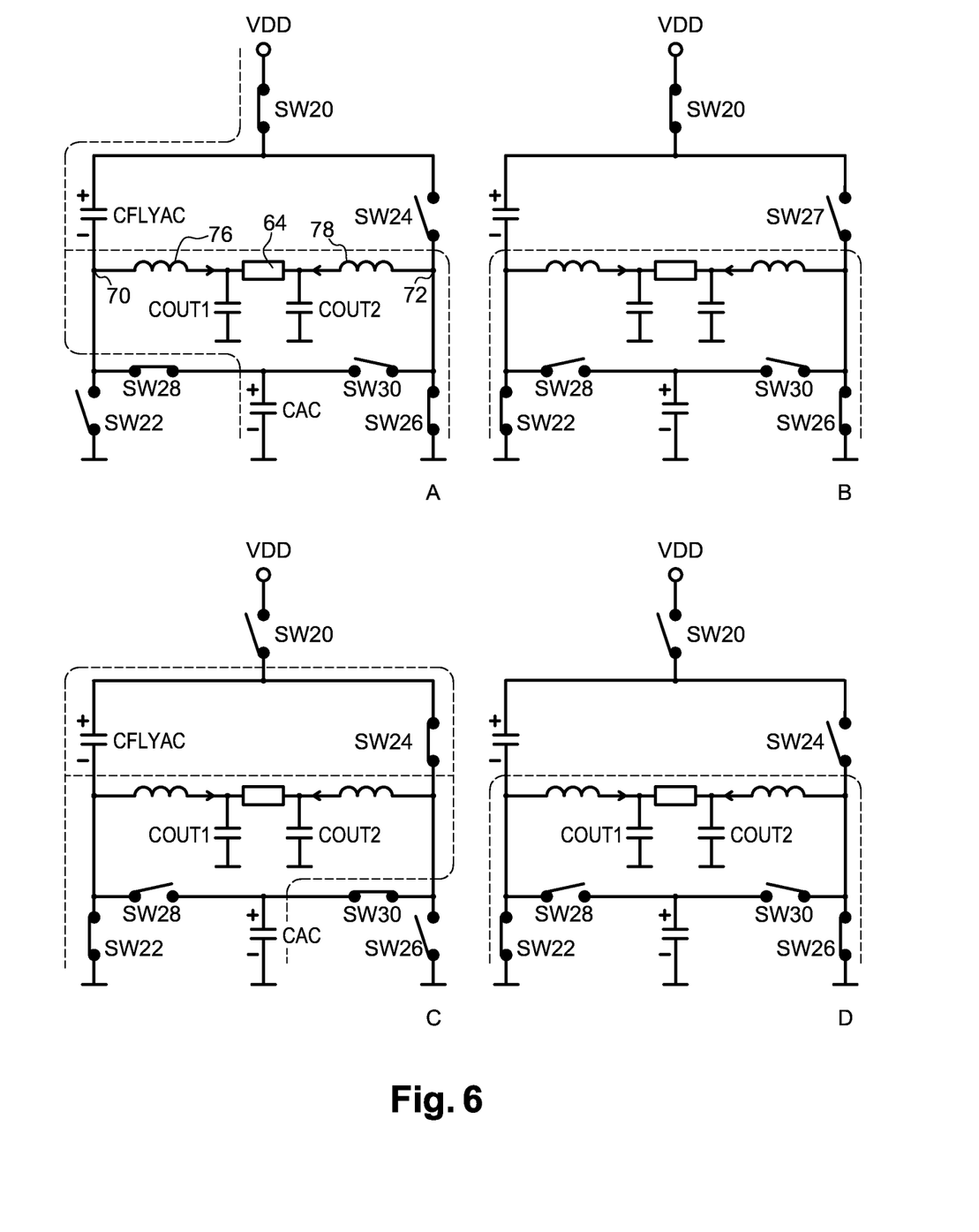
FIG. 6 illustrates a method for controlling the embodiment of FIG. 5.

FIG. 6 illustrates the method for controlling of the embodiment of FIG. 5. More precisely, FIG. 6 comprises four views A, B, C and D each representing a switching phase of the method for controlling the embodiment of FIG. 5.

View A illustrates a phase A during which switches SW20, SW28 and SW26 are on and switches SW24, SW22 and SW30 are off. The capacitors CFLYAC and CAC are charged by the supply voltage VDD. The voltage on the node 70 is substantially equal to half the supply voltage. The voltage on the node 72 is substantially equal to zero. The capacitors COUT1 and COUT2 are charged. The voltage across the terminals of the capacitor COUT1 is higher than the voltage across the terminals of the capacitor COUT2.

View B illustrates a phase B during which switches SW20, SW24, SW28 and SW30 are off and switches SW22 and SW26 are on. The capacitors COUT1 and COUT2 are discharged.

View C illustrates a phase C during which switches SW20, SW28 and SW26 are off and switches SW24, SW22 and SW30 are on. The capacitors CFLYAC and CAC are charged by the supply voltage VDD. The voltage on the node 72 is substantially equal to half the supply voltage. The voltage on the node 70 is substantially equal to zero. The capacitors COUT1 and COUT2 are charged. The voltage across the terminals of the capacitor COUT2 is higher than the voltage across the terminals of the capacitor COUT1.

View D illustrates a phase D identical to phase B.

Figure 7:
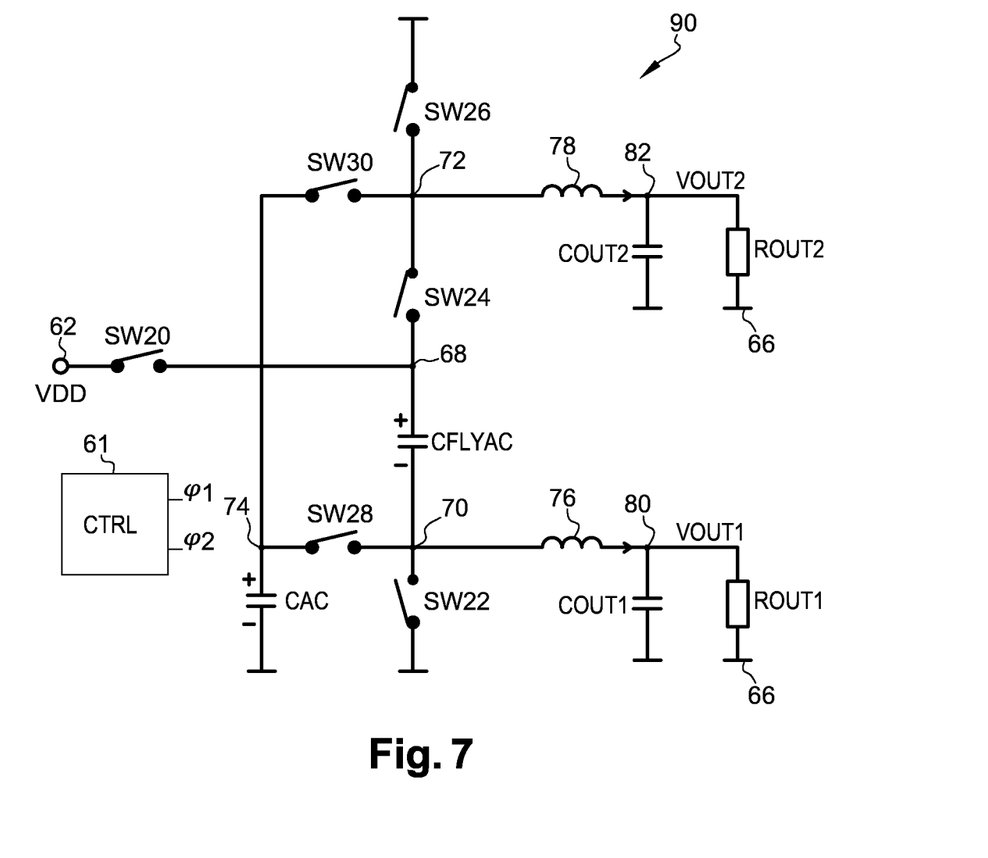
FIG. 7 is a circuit diagram illustrating yet another embodiment of a power converter.

FIG. 7 illustrates another embodiment of a power converter 90. The converter 90 is a DCDC converter.

The converter 90 differs from the converter 60 in that the converter 90 comprises two output nodes, corresponding to nodes 80 and 82, on which are generated two distinct output voltages, respectively VOUT2 and VOUT1. The converter 90 also differs from the converter 60 in that the converter 90 comprises two resistors ROUT1 and ROUT2 instead of the resistor 64, each resistor being coupled between one of the output nodes and the node 66. In other words, a terminal of the resistor ROUT2 is coupled, preferably connected, to the node 82 and another terminal of the resistor ROUT2 is coupled, preferably connected, to the node 66. The resistor ROUT2 is therefore coupled in parallel with the capacitor COUT2. The resistor ROUT2 is therefore coupled in series with the inductor 78. A terminal of the resistor ROUT1 is coupled, preferably connected, to the node 80 and another terminal of the resistor ROUT1 is coupled, preferably connected, to the node 66. The resistor ROUT1 is therefore coupled in parallel with the capacitor COUT1. The resistor ROUT1 is therefore coupled in series with the inductor 76.

The method for controlling the converter 90 is identical to the method for controlling the converter 60 described in relation with the FIG. 6.

The converter 90 for example comprises the control circuit (CTRL) 61 configured to control each of the switches of the converter 90. For example, the control circuit 61 is configured to generate a control signal φ1 for controlling the switches SW20, SW26 and SW28 and a control signal φ2 for controlling the switches SW22, SW24 and SW30.

The converter 90 is preferably adapted to power, by the output node VOUT2, circuits consuming a power higher than the power consumed by the circuits powered by the output node VOUT1.

Figure 8:
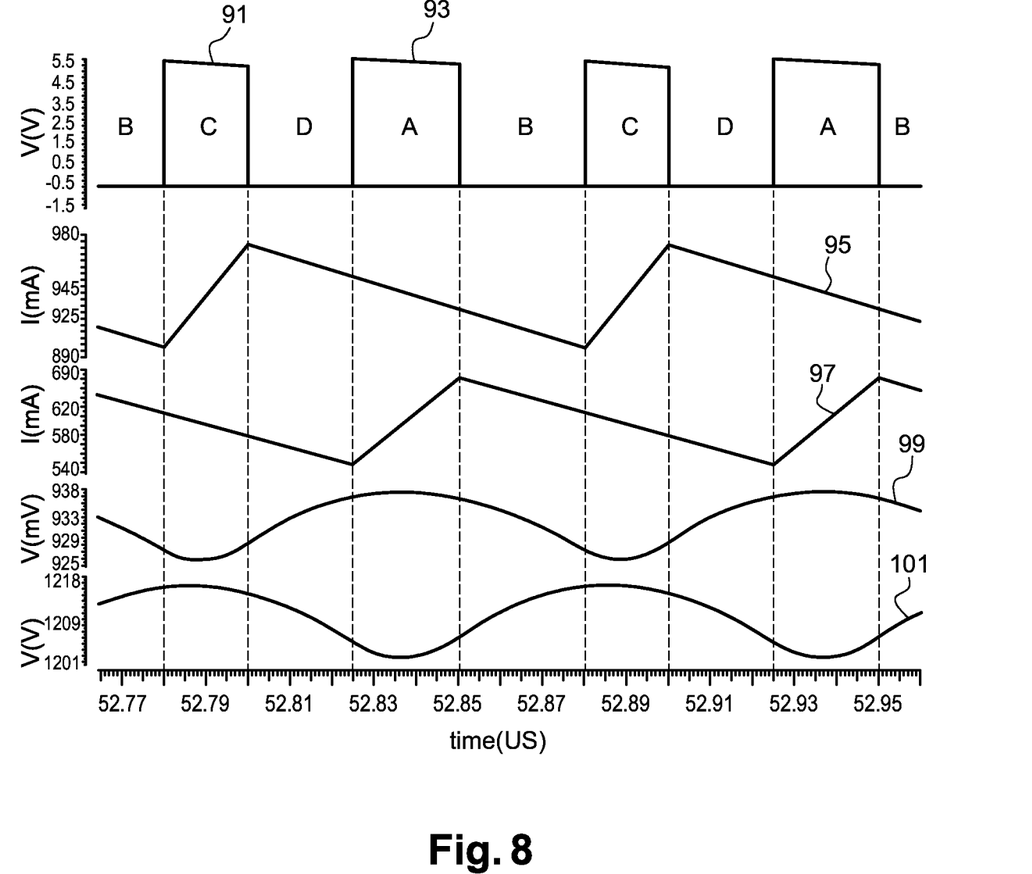
FIG. 8 is a timing diagram illustrating the behavior of the embodiment of FIG. 7.

FIG. 8 is a timing diagram illustrating the behavior of the embodiment of FIG. 6. FIG. 8 illustrates the behavior of:
the voltage, in volts (V(V)), on the node 72, by a curve 91;
the voltage, in volts (V(V)), of the node 70, by a curve 93;
the current, in milliamps (I(mA)), flowing through the inductor 78, by a curve 95;
the current, in milliamps (I(mA)), flowing through the inductor 76, by a curve 97;
the voltage VOUT2, in millivolts (V(mV)), by a curve 99;
the voltage VOUT1, in volts (V(V)), by a curve 101.

As described in relation with FIG. 6, the converter 90 is preferably successively in the phase A, in the phase B, in the phase C and in the phase D.

During a phase A, preferably following a phase D, the voltage on the node 70 is substantially equal to half the supply voltage and the voltage on node 72 is substantially equal to zero. In this example, the supply voltage VDD is equal to 10 V. The current through the inductor 78 decreases while the current through the inductor 76 increases. The capacitor COUT1 is charged while the capacitor COUT2 is discharged.

During a phase B, preferably following a phase A, the voltage on the node 70 and the voltage on node 72 are substantially equal to zero. The current through the inductor 78 and the current through the inductor 76 decrease. The capacitor COUT1 and the capacitor COUT2 are discharged.

During a phase C, preferably following a phase B, the voltage on the node 72 is substantially equal to half the supply voltage and the voltage on node 70 is substantially equal to zero. The current through the inductor 78 increases while the current through the inductor 76 decreases. The capacitor COUT2 is charged while the capacitor COUT1 is discharged.

During a phase D, preferably following a phase C, the voltage on the node 70 and the voltage on node 72 are substantially equal to zero. The current through the inductor 78 and the current through the inductor 76 decrease. The capacitor COUT1 and the capacitor COUT2 are discharged.

The output voltages VOUT1 and VOUT2 oscillate slightly around an average value and can be considered substantially equal to the average value. The values of the output voltages VOUT1 and VOUT2 can be different or substantially equal.

Figure 9:
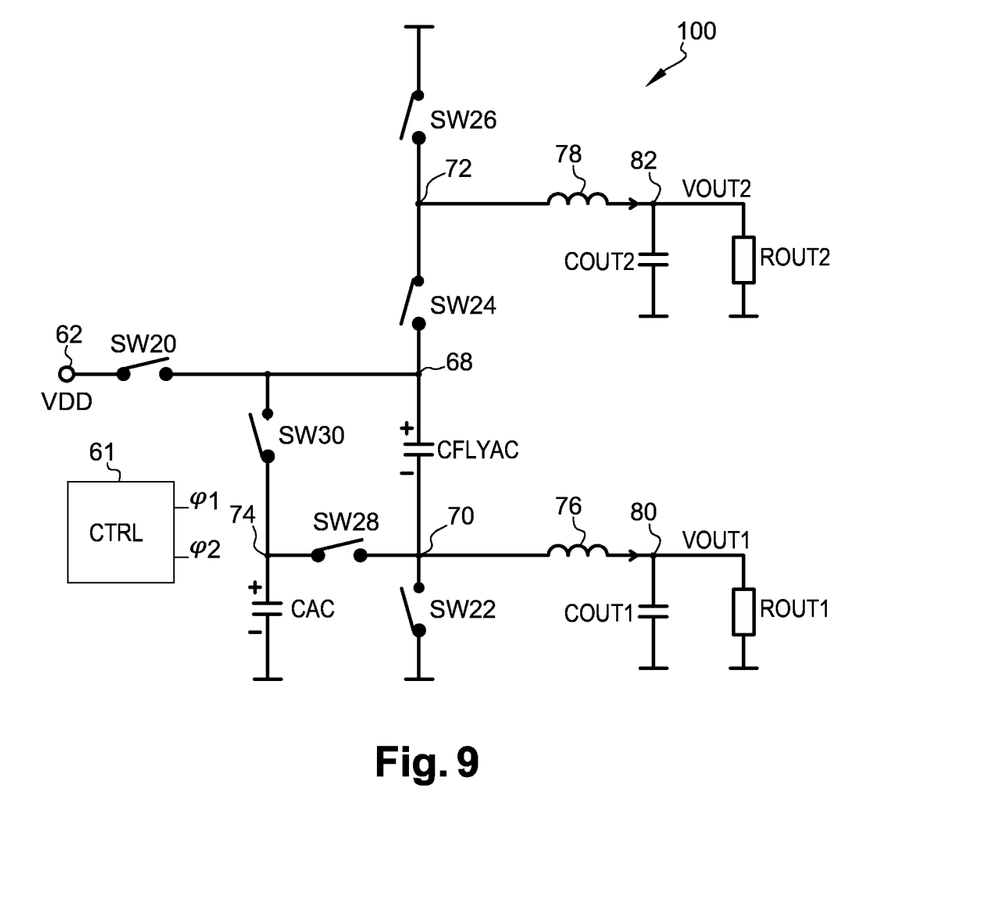
FIG. 9 is a circuit diagram illustrating another embodiment of a power converter.

FIG. 9 illustrates another embodiment of a power converter 100. The converter 100 differs from the converter 90 in that the switch SW30 is coupled between the node 68 and the node 74, and not between the nodes 72 and 74.

According to another embodiment, this difference can also be applied to the embodiment of FIG. 5.

The converter 100 is preferably adapted to power, by the output node VOUT1, circuits consuming a power higher than the power consumed by the circuits powered by the output node VOUT2.

The method for controlling the converter 100 is identical to the method for controlling the converter 90.

The converter 100 for example comprises the control circuit (CTRL) 61 configured to control each of the switches of the converter 100. For example, the control circuit 61 is configured to generate a control signal φ1 for controlling the switches SW20, SW26 and SW28 and a control signal φ2 for controlling the switches SW22, SW24 and SW30.

An advantage of the embodiments described above is that most, or all, of the capacitors and the switches can be sized to support half the supply voltage and do not have to be able to support the supply voltage VDD. In other words, maximal ratings of switches and capacitors is limited to half the supply voltage. The converter therefore has a relatively low current leakage and has a relatively low cost in terms of surface area and power consumption.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A power converter comprising:
a first capacitor;
a second capacitor coupled in series with the first capacitor; and
a fourth capacitor,
wherein a first switch, the first capacitor, the second capacitor and a second switch are coupled in series between a power supply node and a reference node,
wherein a third switch, the fourth capacitor, and a fourth switch are coupled in series between the reference node and an output node,
wherein the power converter is configured to:
during a first phase, charge the first and second capacitors by a supply voltage (VDD) so that a voltage across terminals of each of the first and second capacitors is substantially equal to half the supply voltage, and turn on the first, second, third and fourth switches; and
during a second phase, discharge the second capacitor to the third capacitor, and turn off the first, second, third and fourth switches.

2. The power converter according to claim 1, wherein the first and second capacitors have the same capacitance.

3. The power converter according to claim 1, wherein the power converter is configured so that an average current flowing through the first capacitor during the first phase and the second phase is substantially equal to zero.

4. The power converter according to claim 1, wherein the fourth capacitor has the same capacitance as the second capacitor, wherein the fourth capacitor is coupled in series with the first capacitor, and wherein the power converter is configured to:
discharge, during the first phase, the fourth capacitor to the third capacitor; and
discharge, during the second phase, the first capacitor to the fourth capacitor.

5. The power converter according to claim 1,
wherein a fifth switch, the first capacitor, a sixth switch and the fourth capacitor are coupled in series,
wherein the fifth switch, the second capacitor and a seventh switch are coupled in series between the reference node and the output node, and
wherein the power converter is configured to:
turn off the fifth, sixth and seventh switches during the first phase, and
turn on the fifth, sixth and seventh switches during the second phase.

6. The power converter according to claim 5, further comprising:
a ninth switch coupled between the first capacitor and the sixth switch, wherein the power converter is configured to turn off the ninth switch during the first phase and to turn on the ninth switch during the second phase; and
a tenth switch coupled in parallel with the first capacitor and the ninth switch, wherein the power converter is configured to turn on the tenth switch during the first phase and turn off the tenth switch during the second phase.

7. A power converter comprising:
a first capacitor; and
a second capacitor coupled in series with the first capacitor,
wherein a first switch, the first capacitor, a second switch and the second capacitor are coupled in series between a power supply node and a reference node,
wherein the first switch, a third switch, a fourth switch and the second capacitor are coupled in series between the power supply node and the reference node,
wherein a node coupling the first capacitor and the second switch to the reference node via a fifth switch is also coupled to a first output node via a first inductor, and
wherein a node coupling the third switch and the fourth switch to the reference node via a sixth switch is also coupled to a second output node via a second inductor,
wherein the power converter is configured to:
charge, during a first phase, the first and second capacitors by a supply voltage so that a voltage across terminals of each of the first and second capacitors is substantially equal to half the supply voltage; and
discharge, during a second phase, the second capacitor to a third capacitor.

8. The power converter according to claim 7, further comprising a resistor coupled between the first and second output nodes, wherein the converter is configured to provide a voltage across terminals of the resistor as an output voltage.

9. The power converter according to claim 7, further comprising a first resistor and a second resistor, and wherein each of the first and second resistors are coupled between one of the first and second output nodes and the reference node.

10. A power converter comprising:
a first capacitor; and
a second capacitor coupled in series with the first capacitor,
wherein a first switch, the first capacitor and a second switch are coupled in series between a power supply node and a reference node,
wherein the first switch, a third switch and a fourth switch are coupled in series between the power supply node and the reference node,
wherein the first switch, a fifth switch and the second capacitor are coupled in series between the power supply node and the reference node,
wherein a node coupling the first capacitor and the second switch to a node coupling the second capacitor and the fifth switch via a sixth switch is also coupled to a first output node via a first inductor,
wherein a node coupling the third switch and the fourth switch to a second output node via a second inductor, and
wherein the power converter is configured to:
charge, during a first phase, the first and second capacitors by a supply voltage so that a voltage across terminals of each of the first and second capacitors is substantially equal to half the supply voltage; and
discharge, during a second phase, the second capacitor to a third capacitor.

11. The power converter according to claim 10, wherein the power converter is configured so that an average current flowing through the first capacitor during the first phase and the second phase is substantially equal to zero.

12. A method for controlling a power converter comprising a first capacitor, a first switch, a second capacitor, and a second switch coupled in series between a power supply node and a reference node, and a third switch, a fourth capacitor, and a fourth switch coupled in series between the reference node and an output node, the method comprising:
during a first phase, charging the first and second capacitors by a supply voltage so that a voltage across terminals of the first and second capacitors is substantially equal to half the supply voltage, and turning on the first, second, third and fourth switches; and
during a second phase, discharging the second capacitor to a third capacitor, and turning off the first, second, third and fourth switches.

13. The method according to claim 12, wherein the first and second capacitors have the same capacitance.

14. The method according to claim 12, wherein an average current flowing through the first capacitor during the first phase and the second phase is substantially equal to zero.

15. The method according to claim 12, wherein the fourth capacitor has the same capacitance as the second capacitor, and wherein the second capacitor is coupled in series with the first capacitor, the method further comprising:
discharging, during the first phase, the fourth capacitor to the third capacitor; and
discharging, during the second phase, the first capacitor to the fourth capacitor.

16. The method according to claim 12,
wherein the power converter further comprises a fifth switch, a sixth switch and a seventh switch,
wherein the fifth switch, the first capacitor, the sixth switch and the fourth capacitor are coupled in series,
wherein the fifth switch, the second capacitor and the seventh switch are coupled in series between the reference node and the output node, and
wherein the method further comprises:
turning off the fifth, sixth and seventh switches during the first phase; and
turning on the fifth, sixth and seventh switches during the second phase.

17. The method according to claim 16, wherein the power converter comprises a ninth switch coupled between the first capacitor and the sixth switch and a tenth switch (SW10) coupled in parallel with the first capacitor and the ninth switch, and wherein the method further comprises:
turning off the ninth switch during the first phase;
turning on the ninth switch during the second phase;
turning on the tenth switch during the first phase; and
turning off the tenth switch during the second phase.

18. A method for controlling a power converter, the power converter
comprising a first capacitor, a second capacitor, a first switch, a second switch, a third switch, a fourth switch, a fifth switch, a sixth switch, a first output node, a first inductor, a second output node and a second inductor,
wherein the first switch, the first capacitor, the second switch and the second capacitor are coupled in series between a power supply node and a reference node,
wherein the first switch, the third switch, the fourth switch and the second capacitor are coupled in series between the power supply node and the reference node,
wherein a node coupling the first capacitor and the second switch to the reference node via the fifth switch is also coupled to the first output node via the first inductor, and
wherein a node coupling the third switch and the fourth switch to the reference node via the sixth switch is also coupled to the second output node of the power converter via the second inductor, the method comprising:
charging, during a first phase, the first and second capacitors by a supply voltage so that a voltage across terminals of the first and second capacitors is substantially equal to half the supply voltage; and
discharging, during a second phase, the second capacitor to a third capacitor.

19. The method according to claim 18,
wherein the power converter comprises a resistor coupled between the first and second output nodes, and wherein the method further comprises measuring a voltage across terminals of the resistor, wherein the measured voltage is an output voltage of the power converter, or
wherein the power converter comprises a first resistor and a second resistor, and wherein each of the first and second resistors are coupled between one of the first and second output nodes and the reference node.

20. The method according to claim 18, wherein an average current flowing through the first capacitor during the first phase and the second phase is substantially equal to zero.

* * * * *

UNITED STATES PATENT AND TRADEMARK OFFICE
CERTIFICATE OF CORRECTION

| | | |
|---|---|---|
| PATENT NO. | : 11,984,796 B2 | Page 1 of 1 |
| APPLICATION NO. | : 17/677806 | |
| DATED | : May 14, 2024 | |
| INVENTOR(S) | : Vratislav Michal | |

It is certified that error appears in the above-identified patent and that said Letters Patent is hereby corrected as shown below:

In the Claims

In Column 11, in Claim 1, Line 60, after "voltage" delete "(VDD)".

In Column 11, in Claim 1, Line 66, delete "the third" and insert -- a third --.

Signed and Sealed this
Eighteenth Day of June, 2024

Katherine Kelly Vidal
*Director of the United States Patent and Trademark Office*